United States Patent [19]
Brown

[11] 3,764,232
[45] Oct. 9, 1973

[54] VACUUM CLEANER FOR VEHICLES
[76] Inventor: John R. Brown, 12808 Livingston Rd., Fort Washington, Md. 20022
[22] Filed: Nov. 22, 1971
[21] Appl. No.: 201,023

[52] U.S. Cl.................. 417/319, 15/313, 192/66, 192/82 R
[51] Int. Cl........ F04b 9/02, F16d 13/24, B60s 1/64
[58] Field of Search...................... 15/313; 417/319, 417/223; 192/85 V, 66, 82 R; 416/169, 133

[56] References Cited
UNITED STATES PATENTS

| | | | |
|---|---|---|---|
| 2,461,174 | 2/1949 | Peterman........................ | 417/319 X |
| 2,999,628 | 9/1961 | Crombie ..................... | 415/219 C X |
| 2,679,909 | 6/1954 | Kiekhaefer........................ | 416/169 |
| 1,756,192 | 4/1930 | Hanson.............................. | 417/319 |
| 3,189,151 | 6/1965 | Sullivan ........................... | 192/85 V |
| 2,307,619 | 1/1943 | Brewer.............................. | 192/85 V |

FOREIGN PATENTS OR APPLICATIONS
1,528,446  8/1969  Germany .......................... 417/319

*Primary Examiner*—William L. Freeh
*Assistant Examiner*—Leonard Smith
*Attorney*—Luke A. Mattare et al.

[57] ABSTRACT

A vacuum cleaner for vehicles comprising a vacuum producing means on a forward part of the engine of the vehicle closely adjacent an electric generator on the engine, said vacuum producing means including a fan in a casing, said electric generator having drive clutch means extending outwardly therefrom, said vacuum producing means mounted closely adjacent said drive clutch means and having a drive clutch means in the casing for engagement with the drive clutch means so that when engaged, the vacuum producing means produces a vacuum for vacuum cleaning the interior of the vehicle, and means for selectively engaging and disengaging said clutch means.

6 Claims, 6 Drawing Figures

PATENTED OCT 9 1973 3,764,232

VACUUM CLEANER FOR VEHICLES

BACKGROUND OF THE INVENTION

This invention relates to a vacuum cleaner for vehicles and more particularly to a central vacuum cleaning system for vehicles wherein a vacuum producing means is mounted in the engine compartment of the vehicle at a forward part thereof closely adjacent the generator or alternator of the vehicle and including clutch means for selective engagement and disengagement with a driven portion of said alternator or generator to operate said vacuum producing means when said clutch means is engaged.

The vacuum producing means includes a rotary fan in a casing; and in one form of the invention, the casing is manually shifted to engage said clutch means and in another form of the invention, vacuum from the intake manifold of the engine of the vehicle is utilized to cause engagement of the clutch means.

Various types of vacuum cleaners for vehicles are known in the prior art, but all of the prior art vehicle vacuum cleaners are either relatively expensive and complicated or are not reliable in operation. Some of the prior art vehicle vacuum cleaners have their own independent motor means for driving the vacuum producing means, and others of the prior art vehicle vacuum cleaners are driven from a portion of the engine, such as the fan belt or the flywheel of the engine. Moreover, some of the prior art vehicle vacuum cleaners are continuously driven while others are selectively engaged and disengaged.

In the prior art vehicle vacuum cleaners which are selectively engaged and disengaged, relatively expensive and complicated clutching mechanisms are used to engage and disengage the vacuum producing means from a drive means.

According to the present invention, an exceptionally simple and economical vehicle vacuum cleaner is provided which is easy to install and which is reliable in operation. According to the present invention, a simple and inexpensive and efficient friction drive or clutch means is provided in the casing of the vacuum producing means in operative association with a complemental friction drive or clutch means on the shaft of the alternator or generator of the vehicle. A simple and inexpensive manually operated control means extends from the interior of the vehicle to the vacuum producing means for selectively engaging and disengaging said friction drive or clutch means.

A conduit extends from the vacuum producing means to the interior of the vehicle for connection of a vacuum cleaner hose to the vacuum producing means.

OBJECTS OF THE INVENTION

It is an object of this invention to provide a vacuum cleaner for vehicles which is exceptionally simple and economical and is reliable in operation.

Another object of this invention is to provide a vacuum cleaner for vehicles in which the vacuum producing means of the vacuum cleaner is driven by the generator or alternator of the vehicle.

A further object of this invention is to provide a central vacuum cleaner system for vehicles wherein the vacuum producing means of the vacuum cleaner system includes clutch means for selectively engaging and disengaging said vacuum producing means with the generator or alternator of the vehicle so that when the clutch means is engaged, the vacuum producing means is driven by the generator or alternator of the vehicle.

DETAILED DESCRIPTION OF THE INVENTION

Figure 1:
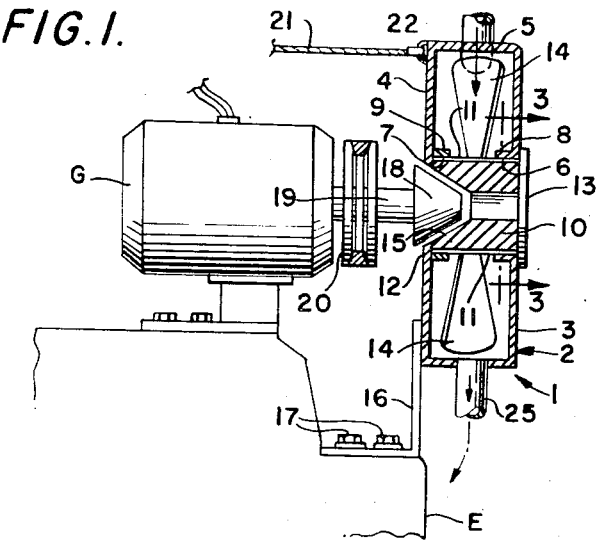
FIG. 1 is a view in elevation, shown partly in section, of the vacuum producing means and drive means of the present invention.
Figure 2:
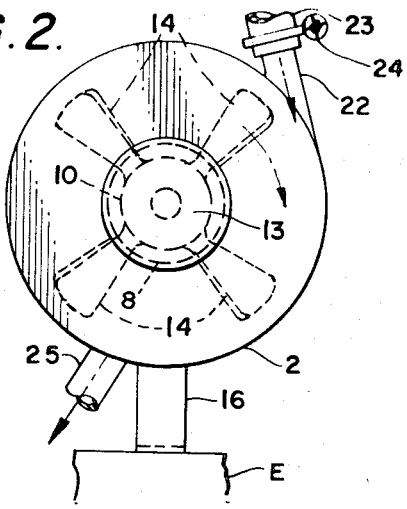
FIG. 2 is a front view in elevation of the vacuum producing means shown in FIG. 1.
Figure 3:
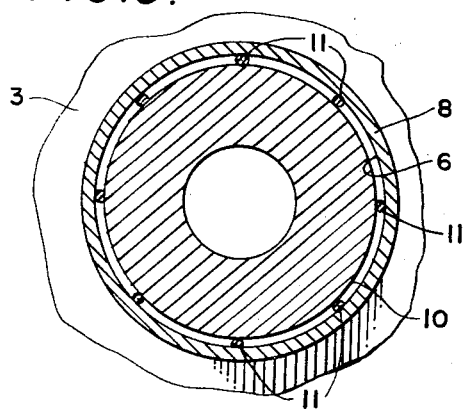
FIG. 3 is an enlarged sectional view taken along line 3—3 in FIG. 1.

Referring now to the drawings, wherein like reference numerals indicate like parts throughout the several views, a vacuum producing means according to the present invention is indicated generally at 1 in FIG. 1 and is mounted at a forward portion of the engine E of the vehicle closely adjacent to and in operative association with the generator G of the vehicle.

The vacuum producing means 1 comprises a cylindrical casing 2 having a front wall 3, back wall 4 and a cylindrical peripheral wall 5. The front and back walls 3 and 4 have axially aligned central openings 6 and 7 therein and a relatively short annular flange 8 and 9 projects axially inwardly of each wall 3 and 4 around the openings 6 and 7 therein. A hub 10 is coaxially mounted within the openings 6 and 7 for rotation relative to the casing and a plurality of axially extending spaced apart ribs 11 are formed on the outer surface of the hub 10 in engagement with the inner surfaces of the flanges 8 and 9 to provide friction reducing bearing means between the hub and casing. The hub 10 is secured against axial movement relative to the casing 2 by means of a radially inwardly extending flange 12 within the opening 7 in the rear wall 4 of the casing and an end plate 13 secured to the front wall 3 over the forward end of hub 10.

A plurality of radially extending fan blades 14 are connected to the hub and extend radially outwardly therefrom through the space between the opposed facing edges of flanges 8 and 9 to adjacent the peripheral wall 5.

A frusto-conically shaped cavity or recess 15 is in the rearward end of hub 10 and comprises a driven clutch means for the hub and blades 14. The casing 2 is supported relative to the engine E by means of an L-shaped bracket 16 suitably affixed to the rear wall 4 of the casing at one end and secured to the engine E by means of bolts or the like 17 at its other end.

The bracket 16 normally supports the casing 2 in the position shown in FIG. 1 with the frusto-conical surface 15 held in equally spaced centered relationship with respect to a frusto-conical drive clutch or cone 18 suitably secured on the end of a shaft 19 of the generator G. A conventional pulley 20 is also suitably secured on the shaft 19 for driving the generator G and the clutch cone 18 and fan blades 14.

A cable or the like 21 is connected to an upper portion of the casing 2 and extends to the interior of the vehicle in a manner similar to that disclosed in U.S. Pat. No. 2,725,587 so that when the cable 21 is pulled, the casing 2 is moved toward the left to bring the frusto-conical clutch cone 18 and the frusto-conically shaped surface 15 into engagement as seen in FIG. 4 for driving the fan blades 14.

Figure 4:
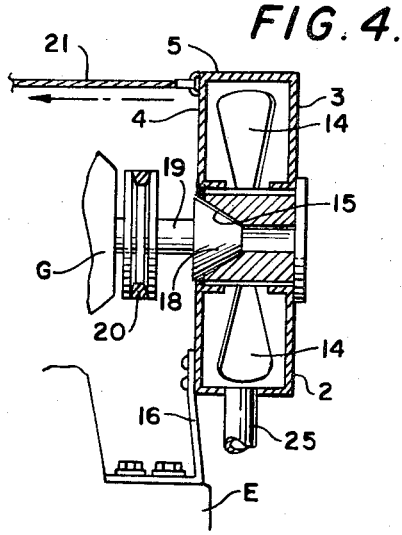
FIG. 4 is a sectional view in elevation of the vacuum producing means of FIG. 1 with the drive means thereof engaged.

As seen in FIG. 4, the mounting bracket 16 is sufficiently flexible so that when the cable 21 is pulled, the bracket will flex to enable the casing 2 to be moved to the left to bring the clutch surfaces 15 and 18 into operative engagement. A generally tangentially extending inlet port 22 is in the peripheral wall 5 and a suitable conduit means 23 is suitably affixed thereto as by means of a clamp or the like 24 and the conduit 23 extends to the interior of the vehicle similarly to that shown in U.S. Pat. No. 2,725,587. A suitable outlet port 25 is also formed in the peripheral wall 5 and may either be connected to a suiable dust collecting bag or the like, not shown, or it may discharge directly into the engine compartment.

Figure 5:
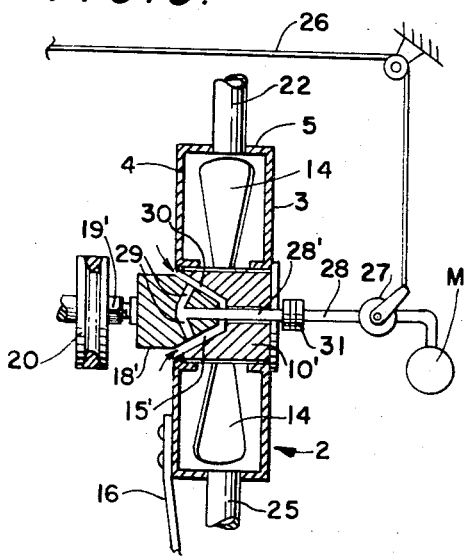
FIG. 5 is a sectional view in elevation similar to FIG. 1 of a second form of the invention, wherein the clutch means is vacuum operated and showing the clutch means disengaged.
Figure 6:
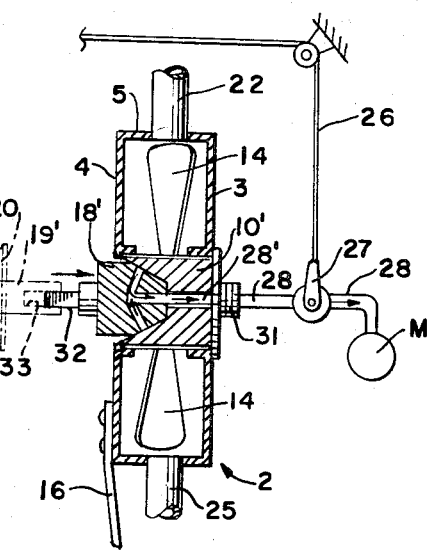
FIG. 6 is a view similar to FIG. 5 with a clutch means engaged.

Referring now to FIGS. 5 and 6, a second form of the invention is shown and is identical with that form of the invention illustrated and described with reference to FIGS. 1 through 4 except that rather than rely upon a cable such as 21 for causing the clutching surfaces to engage, a cable 26 is connected with a suitable valve 27 in a conduit 28 leading from the intake manifold M of the vehicle to the hub 10' and through the hub to the interior of a drive clutch cone 18' having a plurality of ports 29 therein for communicating the vacuum from manifold M through conduit 28 and ports 29 into the space 30 between the clutch cone 18' and complementary driven clutch surface 18' in the hub 10' when the valve 27 is open. The vacuum in space 30 is then effective to cause the clutch cone 18' and clutch surface 15' to engage to drive the blades 14.

The conduit 28 includes a portion 28' extending from a swivel coupling 31 in the conduit coaxially through the hub 10' and into the end of drive clutch cone 18'. The drive clutch cone 18' is connected to the forward end of generator shaft 19' through a spline type connection comprising a relatively short, flat-sided stub shaft 32 extending from the rearward end of the drive clutch cone 18' into a flat-sided socket 33 in the end of generator shaft 19'.

In operation, the casing 2 is normally in the position shown in FIG. 5 with the clutching surfaces 15' and 18' spaced apart. When it is desired to use the vacuum cleaner, the cable 26 is pulled, opening valve 27 and communicating the vacuum in the manifold M with the conduit 28, the passages 29 and the space 30 between the drive clutch cone 18' and clutch surface 15'. The creation of a vacuum in this space pulls the drive clutch cone 18' to the right into abutting engagement with the surface 15' and the axially movable connection 32, 33 between the drive clutch cone 18' and the generator shaft 19' causes the hub 10' and the blades 14 to be turned. The swivel coupling 31 enables the conduit portion 28' to turn relative to conduit 28 and also permits a limited amount of axial movement of the conduit portion 28'. When the valve 27 is closed, as by means of a suitable return spring connected therewith, for example, the vacuum in conduit 28 and ports 29 is vented, thus enabling the clutch cone 18' to move away from the clutch surface 15'. A thin film of air then forms between the clutch cone 18' and clutch surface 15' to maintain space therebetween until the valve 27 is again opened.

The vacuum cleaner may be made from any suitable material such as a synthetic plastic material or a metallic material or the like or any of the various components of the vacuum cleaner such as the casing 2, the blades 14, hub 10, the drive cone 18, and the like, may be made from any suitable material such as a plastic or metallic material or the like, as desired.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents are therefore intended to be embraced by those claims.

I claim:

1. A vehicle vacuum cleaner, comprising, a vacuum producing means mounted on an engine of a vehicle closely adjacent electric generator means for the engine, said electric generator means including a drive shaft extending outwardly therefrom and connected with the engein to be driven by the engine, said vacuum producing means including a casing, a rotatable hub in said casing in axial alignment with the drive shaft of said electric generator means, a plurality of fan blades on said hub, a drive clutch means on the drive shaft of said electric generator means ouwardly of said electric generator means, a driven clutch means on said hub spaced closely adjacent said drive clutch means and shaped complementary thereto, said casing mounted on said engine by a flexible bracket means, said bracket means normally holding said casing with said drive clutch means and driven clutch means in spaced apart relationship, and means connected with said casing to cause movement of said casing toward said electric generator means and engagement of said drive clutch means and driven clutch means to operate said vacuum producing means from the drive shaft of said electric generator means.

2. A vacuum cleaner for vehicles as in claim 1, wherein said casing comprises spacaed apart generally circular front and back walls, a cylindrical peripheral wall connected to and extending between the peripheral edges of said front and back walls, a pair of aligned openings through said front and back walls, and a cylindrical hub means rotatably mounted in said openings in said front and back walls in axial alignment with said drive clutch means on said electric generator means, said blades being connected to said hub and extending radially therefrom between the front and back walls to adjacent the peripheral wall.

3. A vacuum cleaner for vehicles as in claim 2, wherein said driven clutch means comprises a frusto-conically shaped recess in the rearward end of said hub means, and said drive clutch means comprises a frusto-conical drive clutch cone.

4. A vacuum cleaner for vehicles as in claim 3, wherein said means to move said casing comprises a cable connected to the casing at the top thereof and extending to the interior of the vehicle.

5. A vehicle vacuum cleaner as in claim 2, wherein a plurality of axially extending ribs are on the outside of said hub means in engagement with inner surfaces of said aligned openings to reduce friction on said hub means.

6. A vehicle vacuum cleaner as in claim 1, wherein the casing, fan blades, hub, and driven clutch means comprise a synthetic plastic material.

* * * * *